(12) United States Patent
Paradis

(10) Patent No.: US 6,997,414 B2
(45) Date of Patent: Feb. 14, 2006

(54) CARGO DOOR MODIFICATION TO EASE EMERGENCY EGRESS

(76) Inventor: Yves Paradis, 1215, d'Isle-de-France, Boucherville, Quebec (CA) J4B 7Z6

( * ) Notice: Subject to any disclaimer, the term of this patent is extended or adjusted under 35 U.S.C. 154(b) by 83 days.

(21) Appl. No.: 10/726,176

(22) Filed: Dec. 2, 2003

(65) Prior Publication Data
US 2004/0144894 A1    Jul. 29, 2004

(30) Foreign Application Priority Data
Dec. 2, 2002    (CA)    ................................... 2413272

(51) Int. Cl.
*B64C 1/14* (2006.01)
(52) U.S. Cl. ...................... 244/129.5; 49/327; 49/395
(58) Field of Classification Search ............ 244/129.4, 244/129.5; 49/40, 327, 395
See application file for complete search history.

(56) References Cited

U.S. PATENT DOCUMENTS

| | | | | |
|---|---|---|---|---|
| 2,346,977 A | * | 4/1944 | La Sha | 244/129.5 |
| 3,791,073 A | * | 2/1974 | Baker | 49/249 |
| 4,288,944 A | * | 9/1981 | Donovan | 49/395 |
| 4,671,015 A | * | 6/1987 | Curry et al. | 49/465 |
| 5,156,359 A | * | 10/1992 | Noble et al. | 244/129.4 |
| 5,163,639 A | * | 11/1992 | Herrmann et al. | 244/129.5 |

* cited by examiner

*Primary Examiner*—Robert P. Swiatek
(74) *Attorney, Agent, or Firm*—Eric Fincham

(57) ABSTRACT

A locking assembly for an aircraft door and which is particularly suited to a Cessna aircraft having floats, the locking system including an interior handle and an exterior handle, each being connected to a central actuator by separate linkage systems, the actuator in turn being connected to first and second locking members each having a distal end arranged to move between engaged and disengaged positions with respect to a frame portion about the aircraft door.

3 Claims, 5 Drawing Sheets

CARGO DOOR MODIFICATION TO EASE EMERGENCY EGRESS

The present invention relates to aircraft doors and more particularly, relates to a locking system for an aircraft door.

BACKGROUND OF THE INVENTION

A study conducted by the Transportation Safety Board (TSB), on accidents involving airplanes equipped with floats reported 1432 accidents out of which 243 resulted in casualties. The study covered a 15 year period from 1976 to 1990. The 243 fatal accidents resulted in a total of 452 deaths. A more detailed investigation indicated that 41% of the deadly accidents happened during take-off while 37% happen during the approach and landing phases and these accounted for 103 accidents. These 103 accidents involved 276 occupants, passengers and crew, resulting in 168 casualties. Less than 10% of the survivors indicated having no problem evacuating the airplane. Unfortunately a significant number of casualties resulted from drowning while being trapped in the aircraft. This study highlighted the danger of operating sea planes and on the inherent problems associated with emergency egress from the confining fuselage following ditching.

A more comprehensive analysis of this data revealed a safety concern regarding some small aircraft equipped with floats. As required by the Pilot Operating Manual, 20° of flaps must be used for take-off. In this configuration it is extremely difficult to open the aft section of the right hand cargo door making the egress of the passengers located in the aft cabin extremely difficult. The egress problem is also aggravated by the cargo door opening mechanism which is difficult to operate. As a result, Transport Canada has reduced the authorized number of occupants to five for the aircraft. This imposes a severe restriction on aircraft operators and is believed to be of limited efficiency during emergency egress following ditching.

It is therefore an object of the present invention to provide a cargo door modification to facilitate emergency egress from a small aircraft.

It is a further object of the present invention to provide a modification kit which can easily be installed on the particular aircraft and which renders the same safer.

It is a further object of the present invention to provide a modification kit for the cargo door of an aircraft which is operational from both the interior and exterior while being inoperable during the take-off, flight and landing while being easily operable in emergency situations.

According to one aspect of the present invention, there is provided an aircraft door having a locking assembly, the improvement wherein said locking assembly comprises first and second locking members each having a distal end arranged to move between engaged and disengaged positions with respect to a frame portion about the aircraft door, a central actuator, each of the locking members having a proximal end connected to the central actuator such that in a central actuator first position the central actuator will cause the distal ends of the locking members to be in the engaged position while in a central actuator second position, the central actuator will cause the distal ends to be in the disengaged position, an exterior handle movable between an exterior handle closed position and an exterior handle open position, a first linkage extending from the exterior handle to the central actuator, the arrangement being such that when the exterior handle is moved from the exterior closed position to the exterior handle open position, the central actuator will move from the central actuator first position to the central actuator second position, an interior handle moveable between an interior handle closed position and an interior handle open position, and a second linkage extending from the interior handle to the central actuator, the arrangement being such that when the interior handle is moved from the interior handle closed position to the interior handle open position, the central actuator will move from the central actuator first position to the central actuator second position.

In greater detail, the first and second locking members may comprise any suitable; in a preferred embodiment, they comprise first and second rod like members which are designed to slide into and out of a recess in a door frame portion. However, it will be understood that they may engage any other portion of the aircraft and the term door frame portion would include any part of the aircraft which is located proximate the door. Similarly, other locking mechanisms such as hooks and the like may be used.

As aforementioned, the first and second locking members have a proximal end thereof which is secured to a central actuator. The central actuator in turn is connected to separate linkages which extend between the interior handle and the exterior handle respectively. Conveniently, the central actuator may comprise a pivotal member such that in a first position, the distal ends of the locking members are in an engaged position with the door frame portion while in a second position, the central actuator causes the locking members to be in a disengaged position with respect thereto.

The arrangement includes an exterior handle which is movable between an exterior handle closed position and an exterior handle open position. Conveniently, the handle may comprise a ring like member which may be pulled outwardly and then turned in order to move from the closed to open position. A key lock mechanism may also be supplied to securely lock the door when required. The exterior handle, as aforementioned, utilizes a first linkage, which, when the handle is moved from the opened to the closed position, will, through the linkage, cause the central actuator to move from the central actuator first position to the central actuator second position wherein the distal ends of the locking members move to the disengaged position.

The interior handle is also moveable between and interior handle closed position and an interior handle open position, with a second linkage extending from the interior handle to the central actuator such that when the interior handle is moved from the interior handle closed position to the interior handle open position, the central actuator, in a manner similar to that described to the exterior handle, will move from the central actuator first position to the central actuator second position.

In a preferred embodiment, the interior handle has a safety mechanism to prevent the handle being moved from the first position to the second position until the safety mechanism is disengaged. In one embodiment of the present invention the present invention, the safety mechanism comprises a portion of the handle which must be squeezed into position in order that the interior door handle can be moved from the locked to unlocked position.

As a further safety aspect of the present invention, it is preferred that the distance the handle must move from the first closed position to the second open position is substantial to prevent accidental opening thereof. In the case of a rotational movement, it is preferred that the rotational movement be in excess of 45° before the unlocking action will start.

In a preferred embodiment, there are provided first and second micro switches which are associated with the interior handle. A first micro switch would be associated with the safety mechanism and would advise the pilot that the safety mechanism has been engaged. A second micro switch would be associated with the movement of the locking members to an unlocked position.

BRIEF DESCRIPTION OF THE DRAWINGS

Having thus generally described the invention, reference will be made to the accompanying drawings illustrating an embodiment thereof, in which.

DESCRIPTION OF THE PREFERRED EMBODIMENTS

Figure 1:
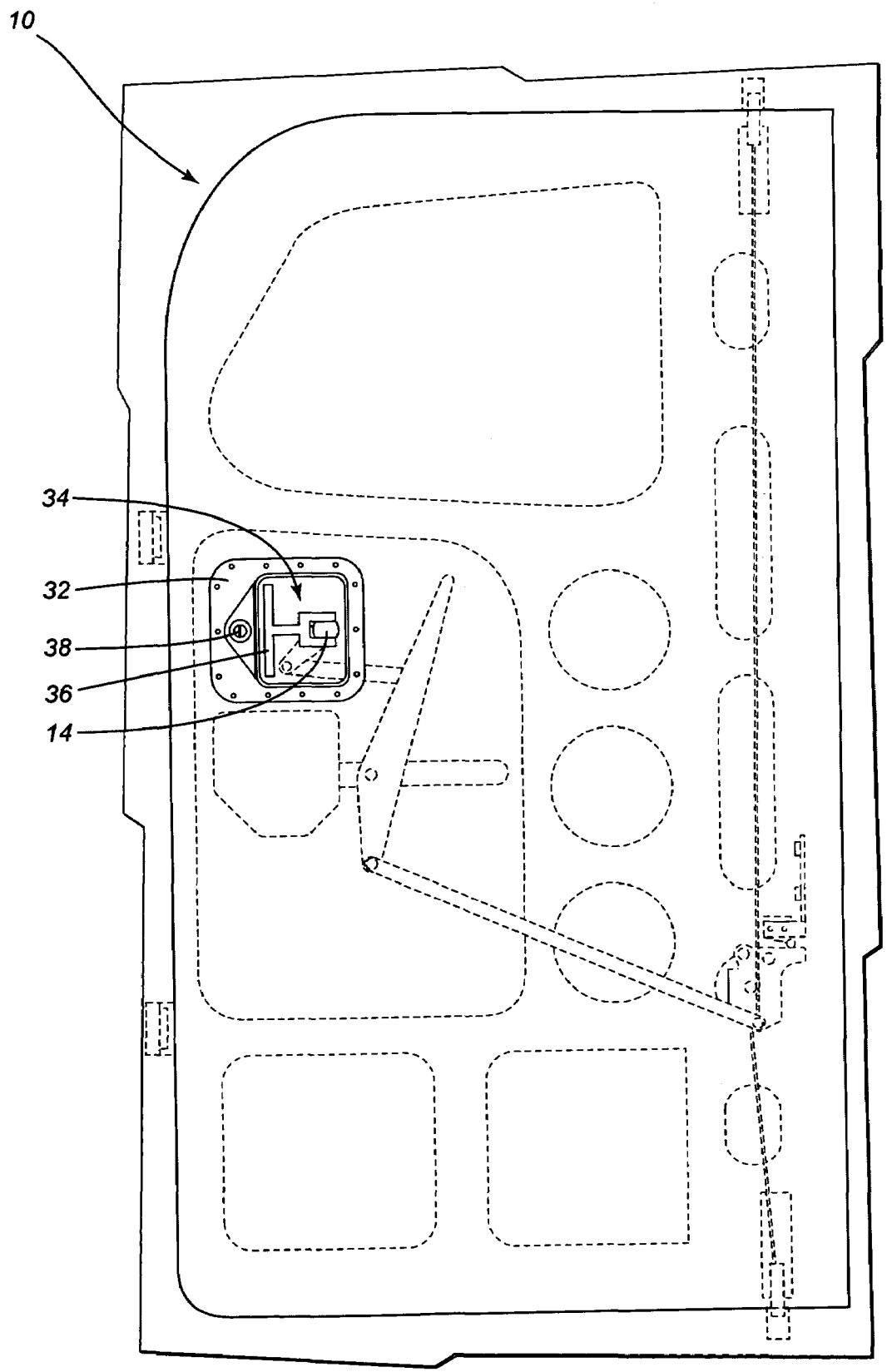
FIG. 1 is a front elevational view of an aft aircraft door, with a portion of the operating mechanism being shown in dotted lines.

Referring to the drawings in greater detail and by reference characters thereto, there is an aircraft door generally designated by reference numeral 10 and which aircraft door is preferably the aft door on a Cessna 206.

Figure 2:
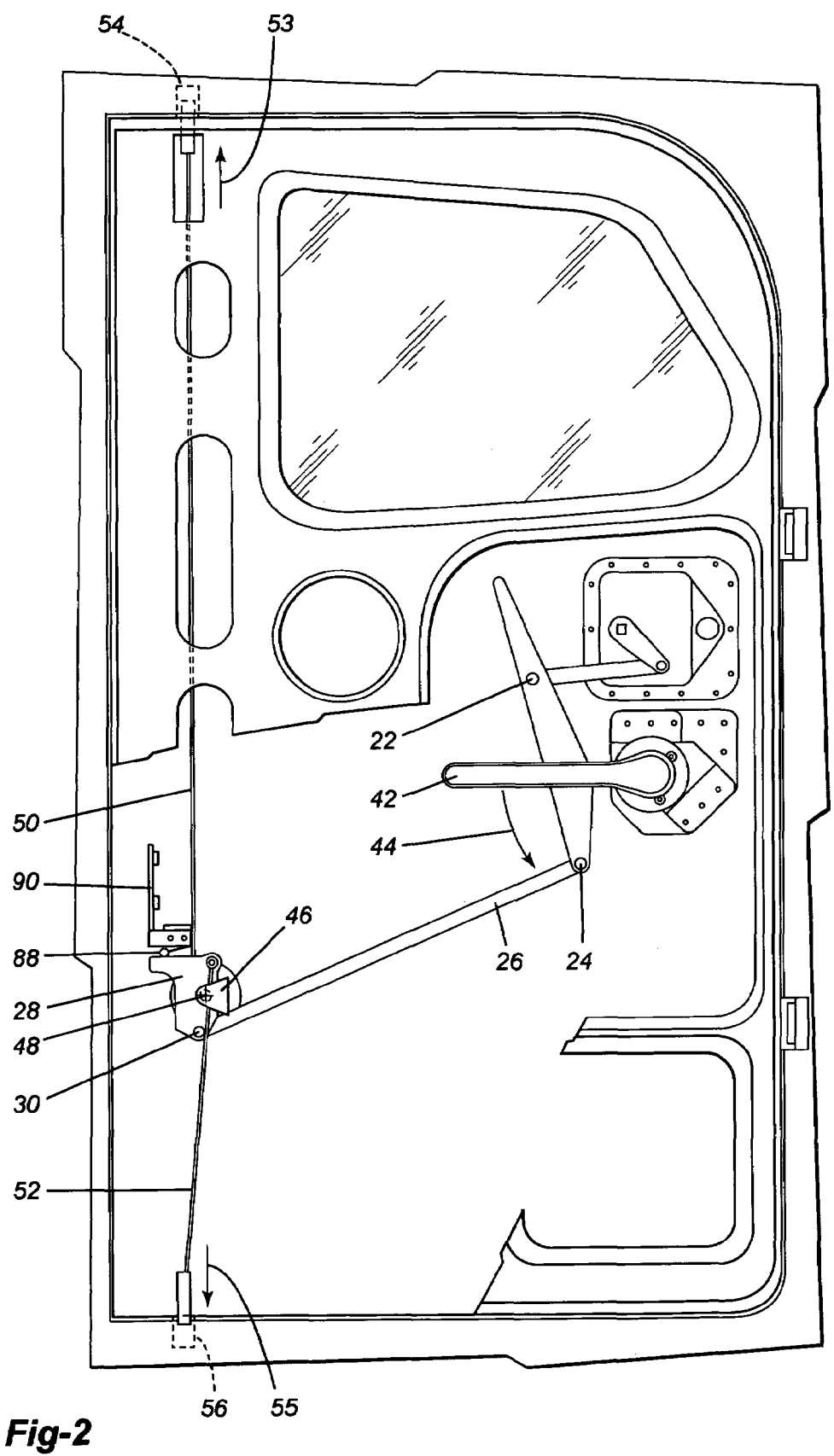
FIG. 2 is a side elevational view, partially in cut away, of the locking assembly according to the present invention when both the inside and outside handles are in a locked position.
Figure 3:
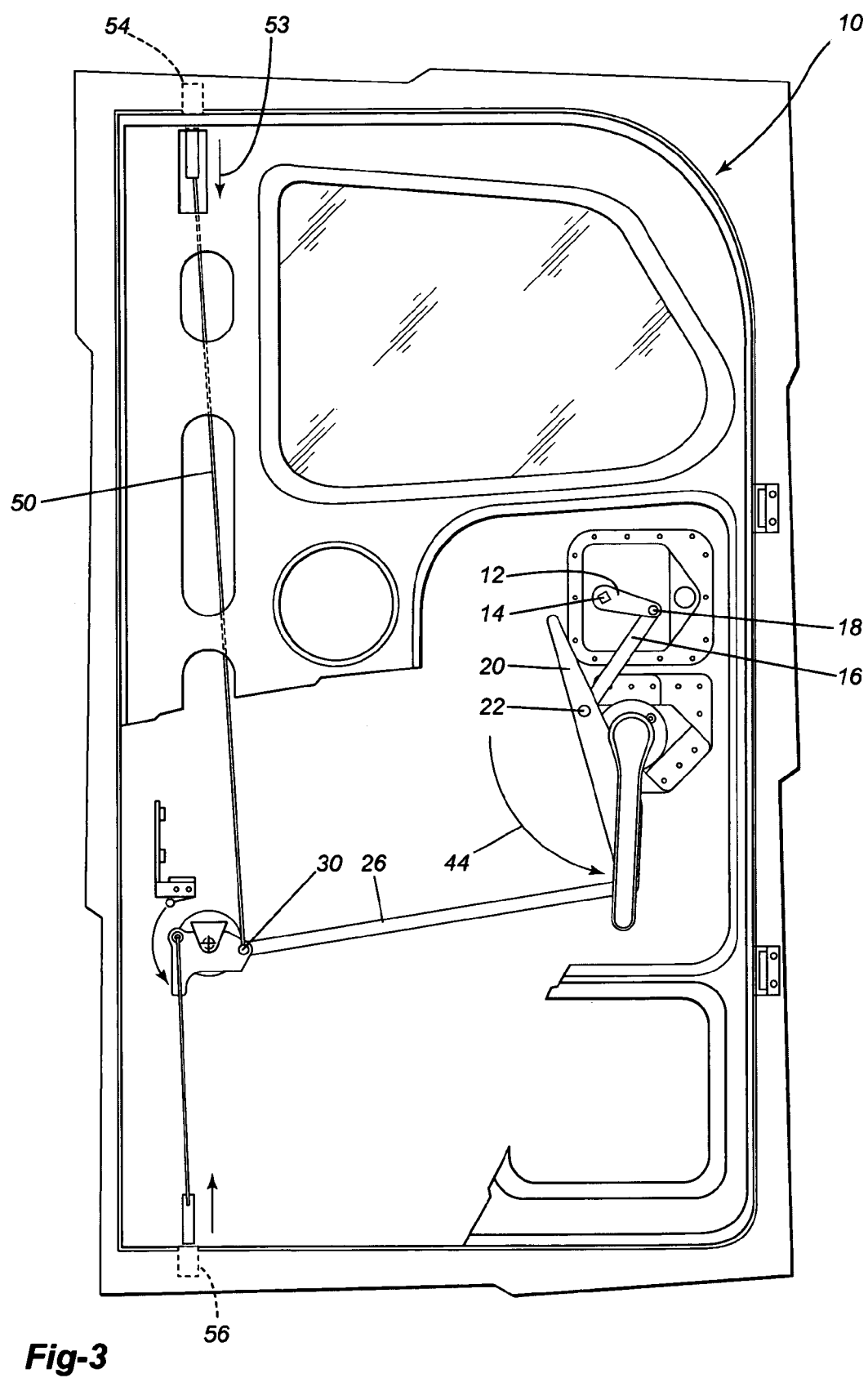
FIG. 3 is a view similar to FIG. 2 showing operation of the unlocking mechanism of the inside handle.
Figure 4:
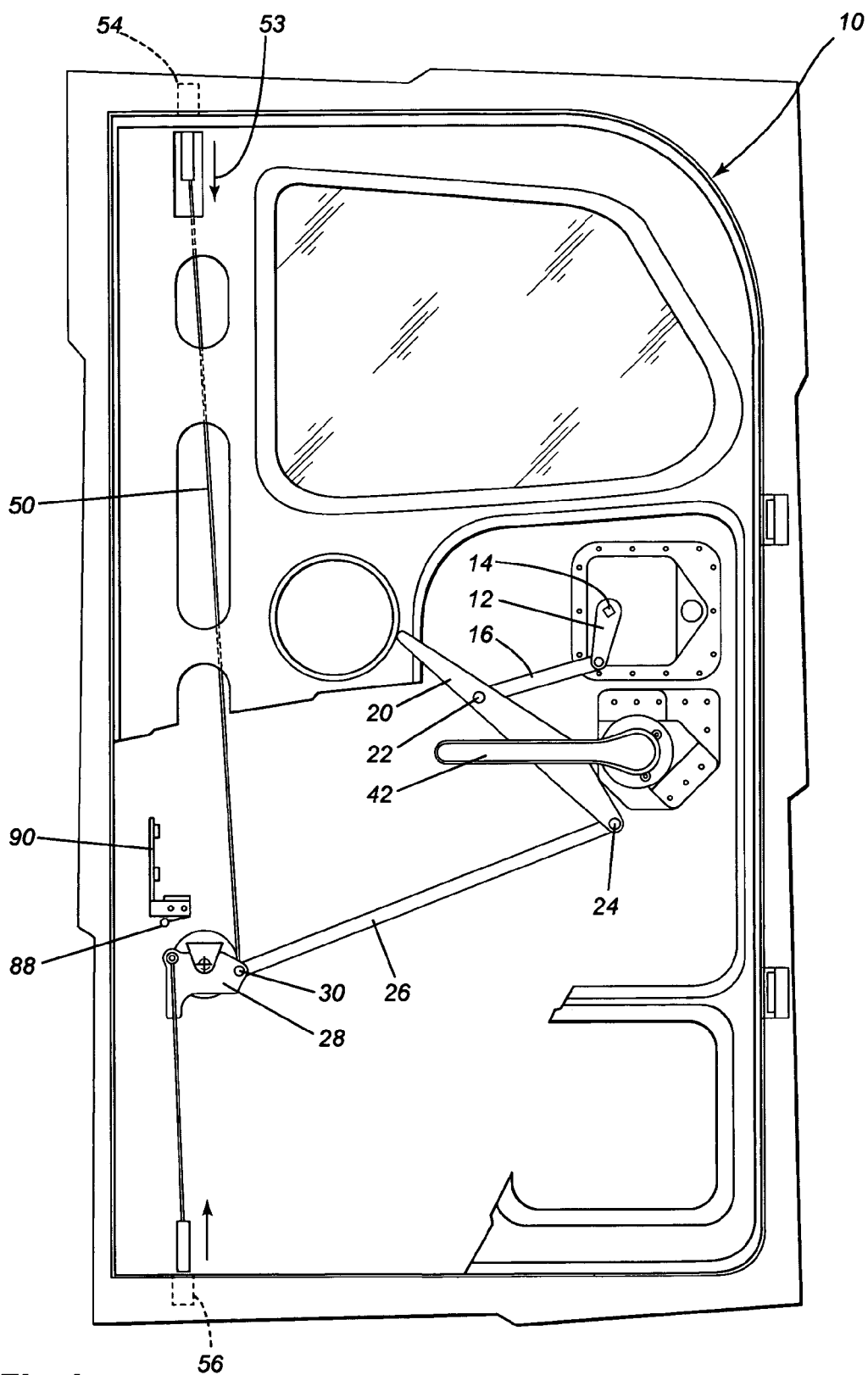
FIG. 4 is a view similar to FIG. 2 showing the operation of the unlocking using the outside handle.
Figure 5:
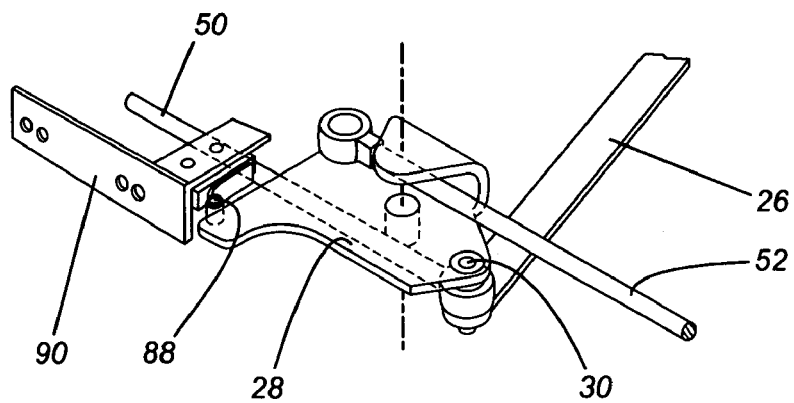
FIG. 5 is a perspective view of a portion of the locking mechanism.

Referring initially to FIGS. 2 to 4, which illustrate the locking mechanism, there is provided a first lever 12 which is connected at one end to a shaft 14. At its other end, there is provided a pivot pin connection 18 to a second lever 16. Second lever 16, in turn, is connected to a third lever 20 by means of a pivot connection 22.

In turn, third lever 20 is connected to a fourth lever 26 by means of a pivot connection 24. At its other end, fourth lever 26 is connected to a central actuator 28 by means of a pivot connection 30.

Referring back to FIG. 1, which illustrates the outside of aircraft door 10, there is provided an exterior handle housing 32 which contains a recess 34. A T-handle 36 is designed to fit within recess 34 and forms the exterior handle for the locking assembly. A keyed lock 38 is provided.

Referring back to FIGS. 2 through 4, there is also provided an inner handle 42 which is designed to be moved as indicated by arrow 44. The operation of inner handle 42 will be described in greater detail hereinbelow.

Central actuator 28 is mounted pivotally within a bracket 46 at pivot point 48. As will be described in greater detail hereinbelow, pivotal movement of central actuator 28 will cause an upper locking member 50 to move upwardly as indicated by arrow 53 such that the distal end thereof fits within a recess 54. Similarly, a lower locking member 52 has a proximal end connected to central actuator 28 and a distal end will fit into a lower recess 56 as indicated by arrow 55.

Figure 6:
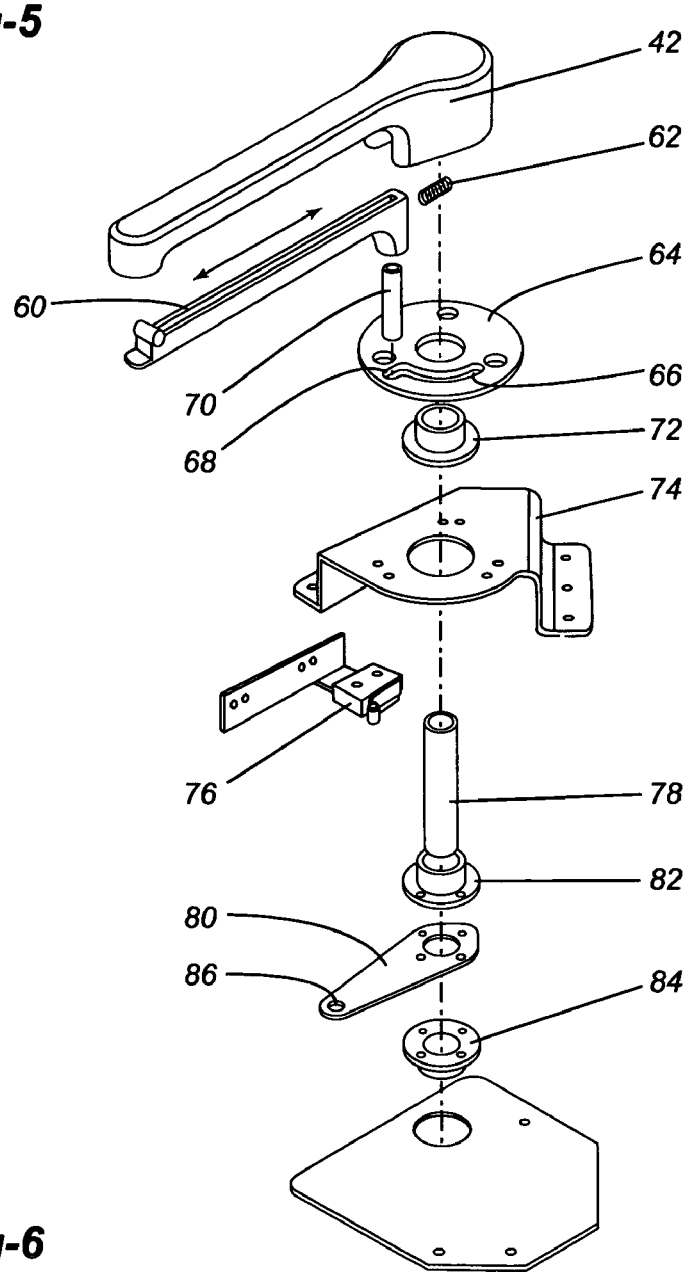
FIG. 6 is an exploded view of the interior handle and associated components.

The structure of inner handle 42 is best illustrated in FIG. 6 and reference will now be had thereto. A latching portion 60 fits within the handle 42 and is spring biased by means of spring 62. Within an annular plate 64, there is provided a key way 66 having a detente position 68. As may be seen in FIG. 6, a pin 70 secured to latching portion 60 when in a locked position, will fit within detente 68 of key way 66. However, upon forward motion by pressing or squeezing of latch 60, it is permitted to move from detente 68 to enter key way 66 and following which handle 42 may then be turned. A bracket 74 is designed to accept a shaft 78 with a bushing 72 being provided to receive the same. A pair of brackets 82 and 84 are arranged to receive therebetween an interconnecting lever 80 which has an aperture 86 at one end thereof. In this regard, the arrangement is such that interconnecting lever 80 is connected to third lever 20 through a pivotable connection at aperture 86.

The preferred arrangement also includes a first micro switch 76 as shown in FIG. 6 with a second micro switch 88 being mounted on a bracket 90 to detect movement of upper locking member 50.

FIG. 2 illustrates the arrangement of the locking assembly when both the interior and exterior handle are in the locked position. Turning to FIG. 3, there is illustrated the position when the interior handle is squeezed and then moved to unlock the door from the inside. As indicated by arrow 44, a large degree of movement is required before unlocking of the door.

The opening of the door from the outside is illustrated in FIG. 4. As may be seen, the turning of shaft 14 will cause levers 12, 16, 20 and 26 to move as indicated to thereby rotate central actuator 28 and to cause the removal of the distal ends of locking members 50, 52 from their respective recesses 54, 56.

First micro switch 76, as previously described, will detect movement of the latching portion 60 and will notify the pilot by suitable conventional display that a first action has been taken with respect to the door. Second micro switch 88 detects movement of upper locking member 50 and again provides the pilot with notification thereof.

The present arrangement is particularly suitable for aft doors on a plane such as a Cessna 206.

It will be understood that the above described embodiment is for purposes of illustration only and changes and modifications may be made thereto without departing from the spirit and scope of the invention.

I claim:

1. In an aircraft door having a locking assembly, the improvement wherein said locking assembly comprises:

first and second locking members each having a distal end arranged to move between engaged and disengaged positions with respect to a frame portion about said aircraft door;

a central actuator, each of said locking members having a proximal end connected to said central actuator such that in a central actuator first position said central actuator will cause said distal ends of said locking members to be in said engaged position while in a central actuator second position, said central actuator will cause said distal ends to be in said disengaged position;

an exterior handle movable about an axis of rotation between an exterior handle closed position and an exterior handle open position;

a first linkage extending from said exterior handle to said central actuator, the arrangement being such that when said exterior handle is moved from said exterior closed position to said exterior handle open position, said central actuator will move from said central actuator first position to said central actuator second position;

an interior handle moveable between an interior handle closed position and an interior handle open position and having an axis of rotation linearly offset and noncoincident with the axis of rotation of said exterior handle; and a second linkage extending from said interior handle to said central actuator, the arrangement being such that when said interior handle is moved from said interior handle closed position to said interior handle open position, said central actuator will move from said central actuator first position to said central actuator second position.

2. The improvement of claim 1 wherein said distal ends of said first and second locking members are each designed to engage a recess in said aircraft door frame.

3. The improvement of claim 1 wherein said interior handle further includes a second locking system, said second locking system being required before said interior handle can be moved from said first closed position to said second open position.

* * * * *